United States Patent
Wang et al.

(10) Patent No.: US 11,761,776 B2
(45) Date of Patent: Sep. 19, 2023

(54) CHARGING SCHEDULING SYSTEMS AND METHODS THEREOF FOR ELECTRIC BUSES

(71) Applicant: Noodoe Corporation, Taipei (TW)

(72) Inventors: John C. Wang, Taipei (TW); Yi-An Hou, Taipei (TW); Chun-Hung Kung, Taipei (TW); Chih-Hsiang Ko, Taipei (TW)

(73) Assignee: NOODOE GROUP INC., Delaware (DE)

( * ) Notice: Subject to any disclaimer, the term of this patent is extended or adjusted under 35 U.S.C. 154(b) by 169 days.

(21) Appl. No.: 17/386,943

(22) Filed: Jul. 28, 2021

(65) Prior Publication Data

US 2022/0057222 A1 Feb. 24, 2022

(30) Foreign Application Priority Data

Aug. 21, 2020 (TW) ................. 109128508

(51) Int. Cl.
  *G01C 21/34* (2006.01)
  *B60L 58/12* (2019.01)
  *G08G 1/127* (2006.01)

(52) U.S. Cl.
  CPC .......... *G01C 21/3469* (2013.01); *B60L 58/12* (2019.02); *G08G 1/127* (2013.01)

(58) Field of Classification Search
  CPC ..... G01C 21/3469; B60L 58/12; B60L 53/67; B60L 53/68; B60L 2200/18; B60L 2240/62; B60L 2240/72; G08G 1/127; Y02T 10/70; Y02T 10/7072; Y02T 10/72; Y02T 90/12; Y02T 90/16
  See application file for complete search history.

(56) References Cited

U.S. PATENT DOCUMENTS

2018/0170349 A1* 6/2018 Jobson ................ B60L 7/18
2019/0152340 A1* 5/2019 Haneda ................ B60L 53/62

* cited by examiner

*Primary Examiner* — Alan D Hutchinson
(74) *Attorney, Agent, or Firm* — McClure, Qualey & Rodack, LLP

(57) ABSTRACT

Charging scheduling systems and methods for electric buses for use in at least one electric bus and a cloud management module are provided. First, a current location of the electric bus is obtained by a positioning unit of the electric bus and a current power state of a battery module of the electric bus is detected by a battery detection unit of the electric bus. A route corresponding to the electric bus is obtained by the cloud management module, wherein the route includes at least one charging point, and records a location of the charging point and a charging efficiency of at least one charging equipment installed at the charging point. Then, the cloud management module determines whether the electric bus needs to be charged with the charging equipment at the charging point according to the current location and the current power state of the electric bus.

10 Claims, 4 Drawing Sheets

CHARGING SCHEDULING SYSTEMS AND METHODS THEREOF FOR ELECTRIC BUSES

BACKGROUND OF THE INVENTION

Field of the Invention

The disclosure relates generally to scheduling systems and methods thereof, and, more particularly to charging scheduling systems and methods for electric buses.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

Traditionally, buses need to use a large amount of gasoline or diesel as fuel, which are highly polluting means of transportation. In order to reduce the impact of carbon emissions to the environment, the development of electric buses to replace traditional buses has become a government policy. Compared with the traditional bus refueling time which only takes a few minutes, the time required for electric bus charging is significantly longer and the charging equipment at the charging point is limited. However, there is a lack of charging schedule mechanisms for electric buses, and it may cause electric buses to wait for charging at one charging point at the same time, or some electric buses spend extra time to find available charging points, which may cause delays of the itinerary, which in turn caused complaints from passengers, and obstructed the development of electric buses.

BRIEF SUMMARY OF THE INVENTION

Therefore, the present invention provides charging scheduling systems and methods for electric buses, which can manage charging schedules for all electric buses, and automatically determine the charging schedule based on the current power state and location of each electric, thus to decide which electric bus should be charged at which charging point according to the urgent need for charging. Consequently, each electric bus does not have to spend a lot of time waiting in line at the charging point, thus enabling electric buses to complete their itinerary without delay.

An embodiment of a charging scheduling system for electric buses comprises at least one electric bus and a cloud management module. The electric bus has a driving monitoring system comprising a positioning unit, a battery detection unit, a network connection unit, and a processing unit. The positioning unit communicates with at least one satellite to obtain a current location of the electric bus. The battery detection unit detects a current power state of a battery module of the electric bus. The processing unit transmits the current location and the current power state of the electric bus via the network connection unit. The cloud management module comprises a storage unit, a network connection unit, and a processor. The storage unit records a route corresponding to the electric bus, wherein the route has at least one charging point, and records a location of the charging point and a charging efficiency of at least one charging equipment installed at the charging point. The network connection unit receives the current location and the current power state of the electric bus via a network. The processor determines whether the electric bus needs to be charged with the charging equipment at the charging point according to the current location and the current power state of the electric bus.

In an embodiment of a charging scheduling method for electric buses for use in at least one electric bus and a cloud management module, a current location of the electric bus is obtained by a positioning unit of the electric bus and a current power state of a battery module of the electric bus is detected by a battery detection unit of the electric bus. A route corresponding to the electric bus is obtained by the cloud management module, wherein the route includes at least one charging point, and records a location of the charging point and a charging efficiency of at least one charging equipment installed at the charging point. Then, the cloud management module determines whether the electric bus needs to be charged with the charging equipment at the charging point according to the current location and the current power state of the electric bus.

In some embodiments, the processor further calculates a remaining power state of the electric bus when it arrives the charging point according to the current location and the current power state of the electric bus, and determines whether the electric bus needs to be charged with the charging equipment at the charging point according to the remaining power state.

In some embodiments, the route has a first charging point and a second charging point, and the distance between the electric bus and the first charging point is less than the distance between the electric bus and the second charging point, the processor instructs the electric bus to perform a charging operation at the first charging point when the processor determined that the electric bus cannot reach the second charging point based on the current location and the current power state of the electric bus.

In some embodiments, the processor obtains a first current location and a first current power state of a first electric bus, and a second current location and a second current power state of a second electric bus, and instructs one of the first electric bus and the second electric bus with a smaller amount of electricity to perform the charging operation at the first charging point when the processor determines that both the first electric bus and the second electric bus can reach the second charging point.

In some embodiments, the processor further calculates a charging period, wherein the electric bus can at least travel to the second charging point after the electric bus is charged using the charging equipment with the charging efficiency for the charging period.

In some embodiments, the processor further transmits the information of the first charging point or the charging period of the charging operation at the first charging point to the electric bus through the network connection unit of the cloud management module.

In some embodiments, the processor obtains a first current location and a first current power state of a first electric bus, and a second current location and a second current power state of a second electric bus, and instructs the first electric bus to perform the charging operation at the first charging point for a first charging period when the processor determined that neither the first electric bus nor the second electric bus can reach the second charging point, and the distance between the first electric bus and the first charging point is less than the distance between the second electric bus and the first charging point, wherein the first electric bus can at least travel to the second charging point after the first electric bus is charged by the charging equipment with the charging efficiency for the first charging period.

In some embodiments, the processor further calculates an estimated arrival time when the second electric bus arrives the first charging point, and instructs the first electric bus to end the charging operation before the estimated arrival time, wherein the first electric bus has already been charged for the first charging period before the estimated arrival time.

In some embodiments, the processor further obtains a traffic state of the route, calculates the estimated arrival time when the second electric bus arrives the first charging point according to the traffic state, accordingly estimates the first charging period for the first electric bus, and calculates a remaining power state of the second electric bus when it arrives the first charging point, and a second charging period for the second electric bus.

Charging scheduling methods for electric buses may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
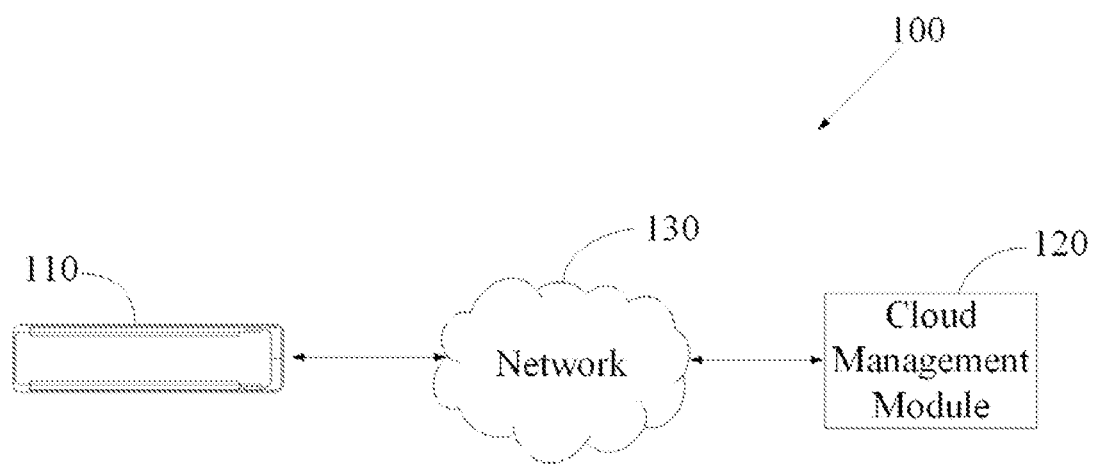
FIG. 1 is a schematic diagram illustrating an embodiment of a charging scheduling system for electric buses of the present invention.

FIG. 1 is a schematic diagram illustrating an embodiment of a charging scheduling system for electric buses of the present invention. As shown in FIG. 1, the charging scheduling system for electric buses 100 comprises at least one electric bus 110 and a cloud management module 120. In some embodiments, the electric bus 110 can connect to the cloud management module 120 via a network 130, such as a wired network, a telecommunication network, and a wireless network, such as a Wi-Fi network or the like. The electric buses 100 provides services based on a route, wherein the route has one or more charging points, and records the location of the respective charging point, and a charging efficiency of at least one charging equipment installed at the respective charging point. For example, the charging point can be set at each transfer station and/or stop station in the route of the electric bus 110. Therefore, the electric bus 110 can perform charging operations by the way when stopping at a specific transfer station or stop station to get on and off passengers. It is noted that, the location of the charging point above is only an example of the present invention, and it is not limited thereto. The charging equipment can output electric power with the charging efficiency for charging at least one electric bus. It is understood that, the charging efficiency of the charging equipment determines the charging period needed for the electric bus 110. For example, the charging efficiency can define the maximum charging output power supported by the charging equipment per hour, wherein the charging period for the charging equipment with higher charging efficiency is less than that for the charging equipment with lower charging efficiency. In some embodiments, the charging equipment can be used for charging an electric bus 110. In some embodiments, the charging equipment can be used for charging several electric buses 110 at a time. The cloud management module 120 can generate instructions, and transmit the instructions to the electric bus 110 through the network 130, to manage the charging schedule of the electric buses 110. That is, the cloud management module 120 determines which electric bus 110 to be charged at which charging station, and sends related instructs to the electric bus 110.

Figure 2:
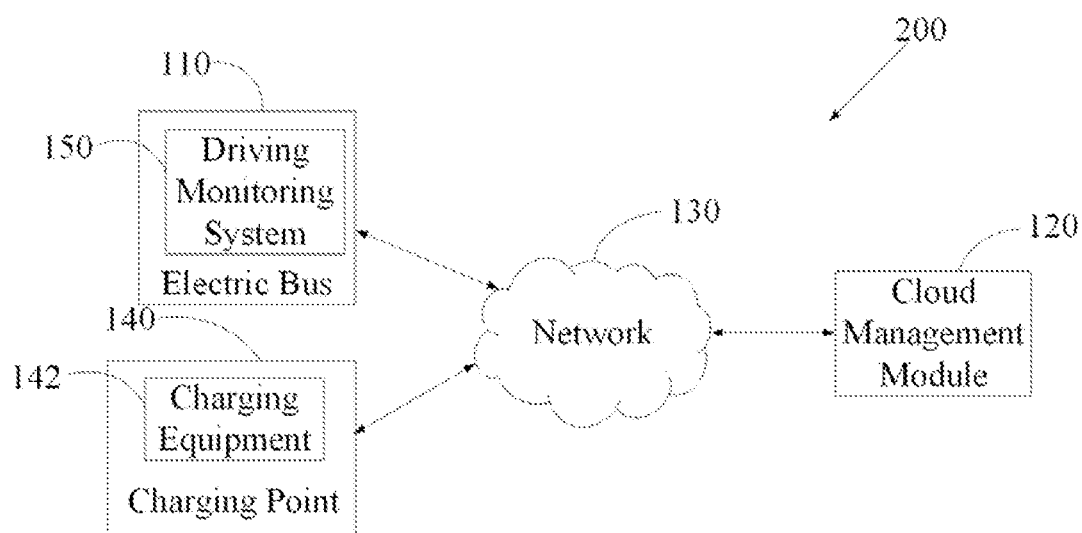
FIG. 2 is a schematic diagram illustrating another embodiment of a charging scheduling system for electric buses of the present invention.

FIG. 2 is a schematic diagram illustrating another embodiment of a charging scheduling system for electric buses of the present invention. As shown in FIG. 2, the charging scheduling system for electric buses 200 comprises at least one electric bus 110, a charging point 140 and a cloud management module 120. In some embodiments, the electric bus 110 can connect to the cloud management module 120 via a network 130, such as a wired network, a telecommunication network, and a wireless network, such as a Wi-Fi network or the like. The electric buses 100 provides services based on a route, wherein the route has one or more charging points 140, and records the location of the respective charging point 140, and a charging efficiency of at least one charging equipment 142 installed at the respective charging point 140. For example, the charging point 140 can be set at each transfer station and/or stop station in the route of the electric bus 110. Therefore, the electric bus 110 can perform charging operations by the way when stopping at a specific transfer station or stop station to get on and off passengers. It is noted that, the location of the charging point above is only an example of the present invention, and it is not limited thereto. The charging equipment 142 can output electric power with the charging efficiency for charging at least one electric bus 110. It is understood that, the charging efficiency of the charging equipment 142 determines the charging period needed for the electric bus 110. For example, the charging efficiency can define the maximum charging output power supported by the charging equipment 142 per hour, wherein the charging period for the charging equipment with higher charging efficiency is less than that for the charging equipment with lower charging efficiency. The electric bus 110 has a driving monitoring system 150, which has processing and computing capabilities to monitor the driving status of the electric bus 110 and control the operation of the electric bus 110 accordingly, and cooperate with the cloud management module 120 to perform the charging scheduling methods of the present invention. The driving monitoring system 150 has network connection capabilities to receive, download or update various parameters and information required for charging managements. In some embodiments, the charging equipment 142 can be used for charging an electric bus 110. In some embodiments, the charging equipment 142 can be used for charging several electric buses 110 at a time. The cloud management module 120 can generate instructions, and transmit the instructions to the electric bus 110 through the network 130, to manage the charging schedule of the electric buses 110. That is, the cloud management module 120 determines which electric bus 110 to be charged at which charging station, and sends related instructs to the electric bus 110. The cloud management module 120 can connect and communicate with the charging equipment 142 installed at the charging point 140 through the network 130 to perform charging management operations for the charging equipment 142 of the charging point 140. During the execution of the charging scheduling control, the cloud management module 120 can generate and transmit instructions to the charging equipment 142 through the network 130 to allow the charging equipment 142 to output power to the electric bus 110 electrically connected to it or prohibit the charging equipment 142 to output power to this electric bus 110.

Figure 3:
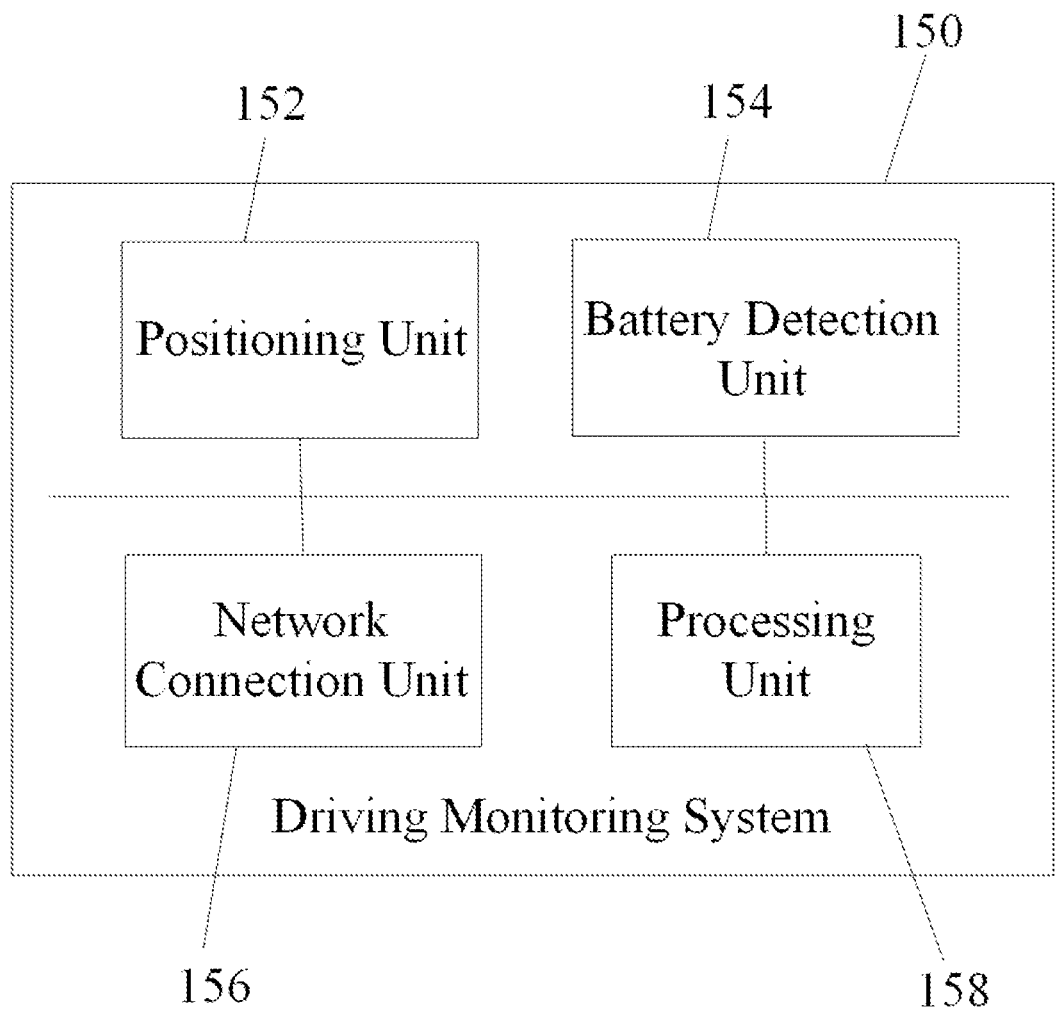
FIG. 3 is a schematic diagram illustrating an embodiment of a driving monitoring system of an electric bus of the present invention.

FIG. 3 is a schematic diagram illustrating an embodiment of a driving monitoring system of an electric bus of the present invention. As shown in FIG. 3, the driving monitoring system 150 of the electric bus 110 comprises a positioning unit 152, a battery detection unit 154, a network connection unit 156, and a processing unit 158. The positioning unit 152 communicates with at least one satellite to obtain a current location, such as latitude and longitude of the electric bus 110. In some embodiments, a specific place can be known based on map data and the location obtained by the positioning unit 152. The battery detection unit 154 may have a detection circuit or other power detection software and hardware components for detecting the power of a specific battery module of the electric bus 110, thus to generate power detection data comprising a power state. For example, the battery detection unit 154 detects a current power state of the battery module of the electric bus 110. The network connection unit 156 can receive, download, or update various parameters and data required for the operations of charging management via a network, such as a wired network, a telecommunication network, and a wireless network, such as a Wi-Fi network. The processing unit 158 controls related operations of software or hardware in the electric bus 110, and performs the charging scheduling methods for electric buss of the present invention, which will be discussed later. For example, the processing unit 158 can be a general-purpose controller, a micro-control unit (MCU), a digital signal processor (DSP), or the like, which provides the function of data analyzing, processing and computing. However, it is understood that the present invention is not limited thereto. In some embodiments, the processing unit 158 transmits the current location and the current power state of the electric bus 110 via the network 130 by using the network connection unit 156, wherein a cloud management module such as the cloud management module 120 can use the current location and power status of the electric bus 110 to perform subsequent charging scheduling.

Figure 4:
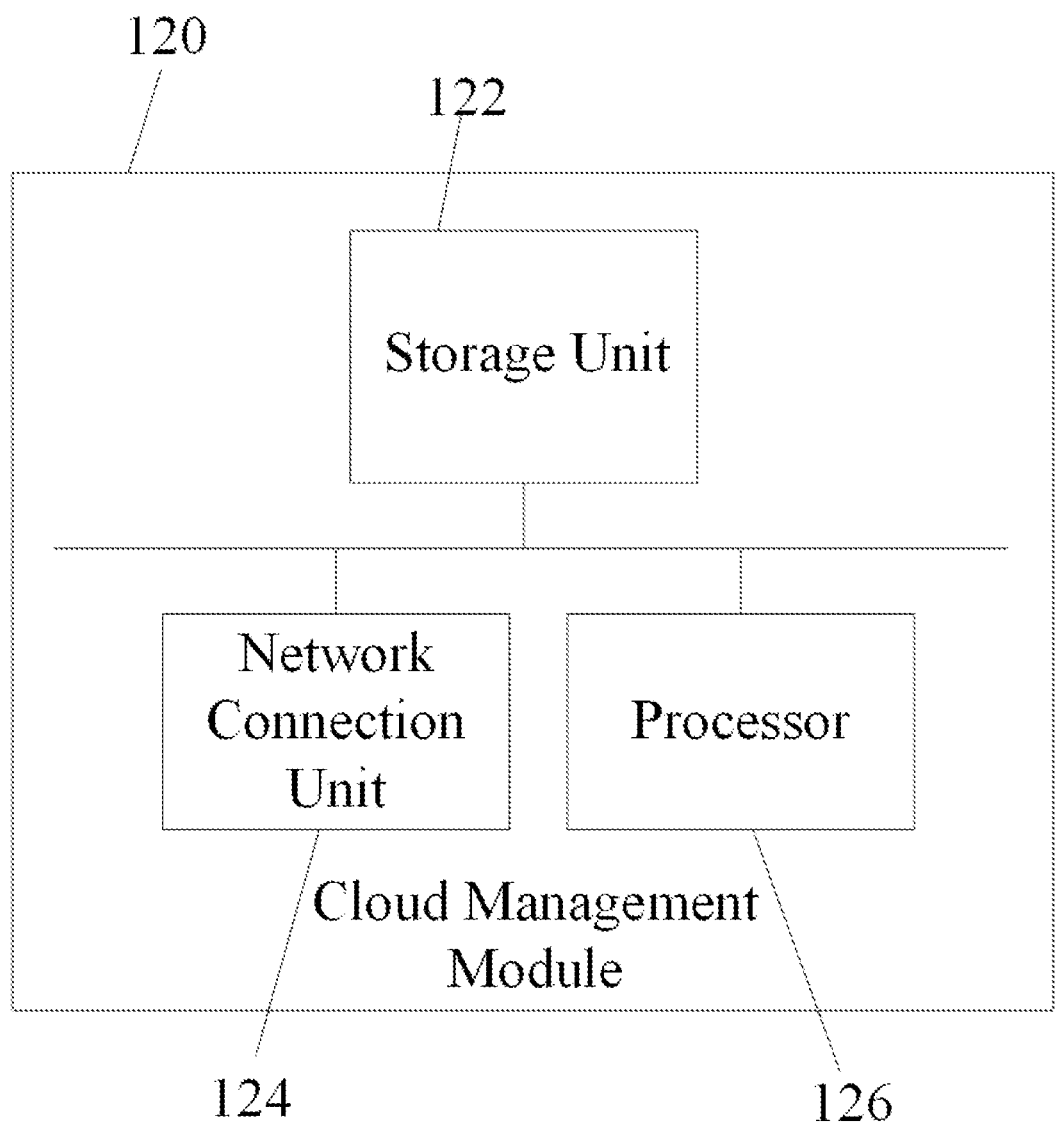
FIG. 4 is a schematic diagram illustrating an embodiment of a cloud management module of the present invention.

FIG. 4 is a schematic diagram illustrating an embodiment of a cloud management module of the present invention. As shown in FIG. 4, the cloud management module 120 of the invention can be any processor-based electronic device, which comprises at least a storage unit 122, a network connection unit 124, and a processor 126. In some embodiments, the cloud management module 120 may be a charging management server, and it is not limited thereto. It is understood that, the cloud management module 120 performs the charging management operations for the electric bus 110. The storage unit 122 may be a memory or a database for storing and recording related data, such as a route corresponding to the electric bus 110, wherein the route has at least one charging point, and records a location of the charging point and a charging efficiency of at least one charging equipment installed at the charging point. For example, the charging point may be set at each transfer station and/or stop station in the route of the electric bus 110, so the electric bus 110 can perform charging operations by the way when stopping at a specific transfer station or stopping station to get on and off passengers. It is noted that, the present invention is not limited to this. The charging equipment can output power with the charging efficiency for charging at least one electric bus. The network connection unit 124 can receive the coupling of the electric buses 110 via a network 130, such as a wired network, a telecommunication network, and a wireless network, such as a Wi-Fi network, and transmit related data to the electric bus 110 via the network 130, thus to instruct and control the electric bus 110 to be charged at specific charging point. The cloud management module 120 can couple to and communicate with the electric bus 110 via the network 130 by using the network connection unit 124. The processor 126 can control the operations of related software and hardware in the cloud management module 120, and perform the charging scheduling methods for electric buses of the present invention, will be discussed later.

For example, the processor 126 may be a general-purpose controller, a MCU, or a DSP, etc., to provide data analysis, processing, and calculation functions, and it is not limited to thereto. It is understood that, the cloud management module 120 can couple to and communicate with the charging equipment of all charging points via the network 130 by using the network connection unit 124, so as to perform the charging management operation for the charging equipment of the charging point. During the charging scheduling operations, the processor 126 can generate and transmit instructions to each charging equipment via the network 130 to allow the charging equipment to output power to an electric bus or prohibit the charging equipment to output power to the electric bus, wherein the electric bus is electrically connected to the charging equipment.

In some embodiments, the processor 126 can calculate a remaining power state of the electric bus 110 when it arrives the charging point according to the current location and the current power state of the electric bus 110, and determines whether the electric bus 110 needs to be charged with the charging equipment at the charging point according to the remaining power state. That is, the processor 126 can estimate the remaining power of the battery module when the electric bus 110 arrives at the charging point based on the capacity data of the battery module and the power state of the battery module and the distance between the current location and the charging point. If the remaining power state of the electric bus 110 at the charging pint is higher than a threshold value, such as half or 20% of the total battery power, the processor 126 determines that the electric bus 110 does not need to be charged at the charging point. If the remaining power state of the electric bus 110 arriving at the charging point is lower than or equal to the threshold value, the processor 126 determines that the electric bus 110 needs to be charged at the charging point.

In some embodiments, the processor 126 may determine which charging point the electric bus 110 is suitable for performing the charging operation according to the distance between the electric bus 110 and each charging point in the route. In some embodiment, the route includes a first charging point and a second charging point, and the distance between the electric bus 110 and the first charging point is less than the distance between the electric bus 110 and the second charging point. When the processor 126 judges that the electric bus 110 cannot reach the second charging point according to the current location and power state of the electric bus 110, the processor 126 instructs the electric bus 110 to perform a charging operation at the first charging point.

In some embodiments, the processor 126 may determine which electric bus is suitable for which charging point to perform the charging operation according to the location and power state of each electric bus and the distance of each charging point in the route. In some embodiments, the processor 126 may obtain a first current location and a first power state corresponding to a first electric bus, and a second current location and a second power state corresponding to a second electric bus. The processor 126 instructs one of the first electric bus and the second electric bus with a smaller amount of electricity to be charged at the first charging point when both the first electric bus and the second electric bus can reach the second charging point.

In some embodiments, the processor 126 may further calculate a charging period, wherein the electric bus 110 can travel to at least the second charging point after the electric bus 110 is charged by the charging equipment with the charging efficiency for the charging period. That is, the processor 126 can estimate the remaining power of the battery module according to the capacity data of the battery module and the power state of the battery module, and then calculate the charging period required to charge the battery module according to the charging efficiency of the charging equipment, such as the maximum charging output power per hour supported by the charging equipment, the distance between the first charging point and the second charging station, such that the electric bus can at least travel to the second charging point. In this way, it can be ensured that each electric bus has enough power to travel to the next charging point for charging.

In some embodiments, the processor 126 can transmit the information of the first charging point or the charging period of the charging operation at the first charging point to the electric bus 110 through the network connection unit 124. The electric bus 110 may have a display interface such as a dashboard or a display panel. When the electric bus 110 receives the above information including the first charging point and/or the charging period of the charging operation at the first charging point via the network 130, the information can be displayed through the display interface, so that the driver of the electric bus 110 can know that he/she should go to the first charging point and/or perform a charging operation for the charging period at the first charging point.

In some embodiments, the processor 126 may determine which electric bus is suitable for which charging point to perform the charging operation and a charging period for charging according to the location and power state of each electric bus and the distance of each charging point in the route. In some embodiments, the processor 126 may obtain a first current location and a first power state corresponding to a first electric bus, and a second current location and a second power state corresponding to a second electric bus. The processor 126 instructs the first electric bus to perform a charging operation at the first charging point for a first charging period when the processor determined that neither the first electric bus nor the second electric bus can reach the second charging point, and the distance between the first electric bus and the first charging point is less than the distance between the second electric bus and the first charging point, wherein the first electric bus can at least travel to the second charging point after the first electric bus is charged by the charging equipment with the charging efficiency for the first charging period. That is, if both the first electric bus and the second electric bus need to be charged at the first charging point, the processor 126 may instruct the first electric bus that first arrives at the first charging point to be charged for a period of time, so that the first electric bus can have enough power to go to the second charging point for subsequent charging. The second electric bus that arrives at the first charging point later can be charged after the first electric bus completes the charging operation. Similarly, the processor 126 may instruct the second electric bus to perform a charging operation at the first charging point for a second charging period, wherein when the second electric bus is charged by the charging equipment with the charging efficiency for the second charging period, the second electric bus can complete the pick-up and drop-off of all subsequent stations in the route or at least drive to the second charging point.

In some embodiments, the processor 126 further calculates an estimated arrival time when the second electric bus arrives the first charging point, and instructs the first electric bus to end the charging operation before the estimated arrival time, wherein the first electric bus has already been charged for the first charging period before the estimated arrival time.

In some embodiments, the processor 126 further obtains a traffic state of the route, calculates the estimated arrival time when the second electric bus arrives the first charging point according to the traffic state, accordingly estimates the first charging period for the first electric bus, and calculates a remaining power state of the second electric bus when it arrives the first charging point, and a second charging period for the second electric bus.

Figure 5:
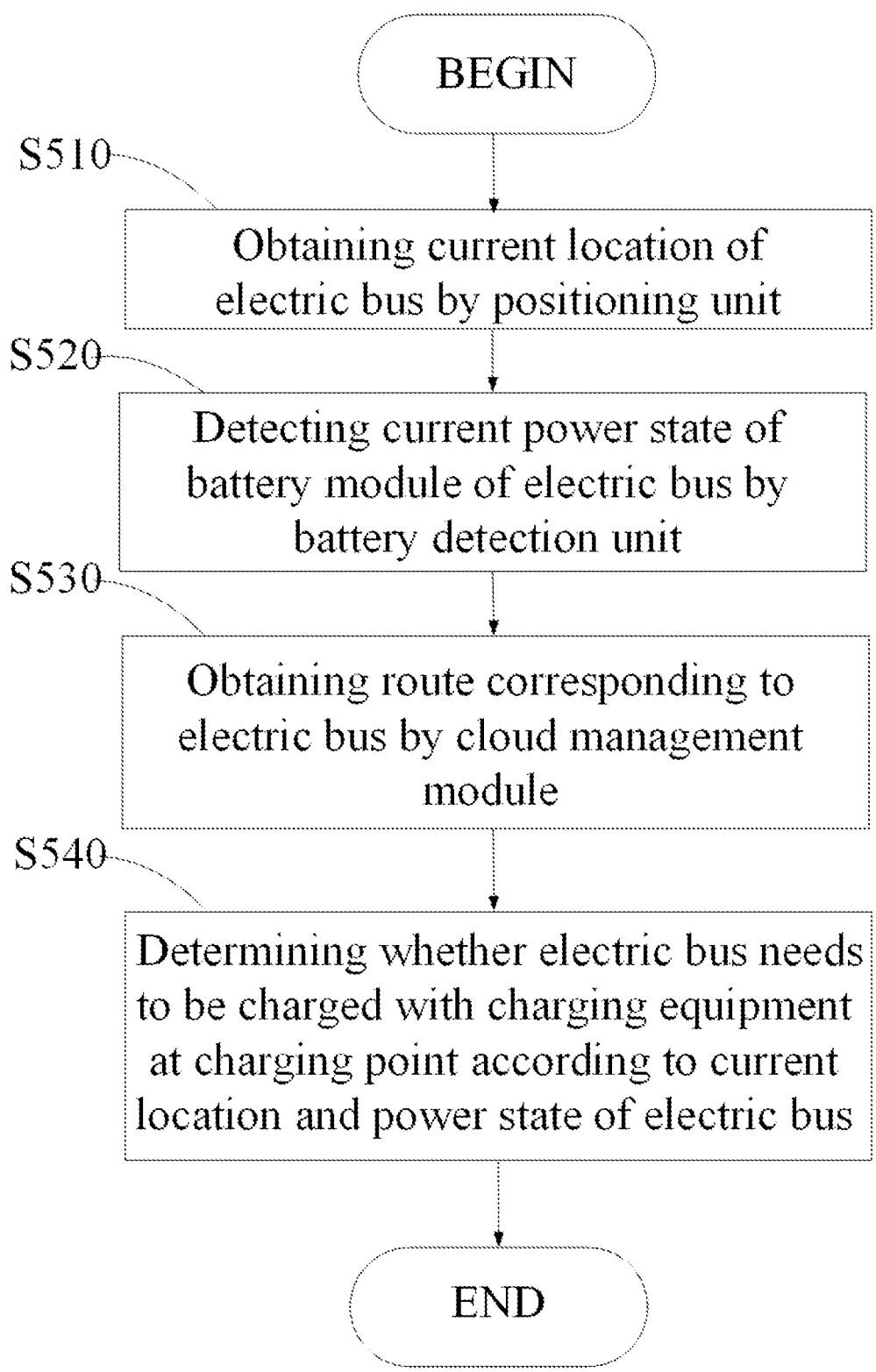
FIG. 5 is a flowchart of an embodiment of a charging scheduling method for electric buses of the present invention.

FIG. 5 is a flowchart of an embodiment of a charging scheduling method for electric buses of the present invention. The charging scheduling method for electric buses of the invention can be used in at least one electric bus and a cloud management module, as shown in FIGS. 1, 2, 3 and 4. The cloud management module can couple to the electric bus via a network, such as a wired network, a telecommunication network, and a wireless network, such as a Wi-Fi network. In some embodiments, the cloud management module may be a charging management server, and it is not limited thereto.

First, in step S510, a current location of the electric bus is obtained by a positioning unit of the electric bus, and in step S520, a current power state of a battery module of the electric bus is detected by a battery detection unit of the electric bus. It is understood that, in some embodiments, the positioning unit can communicate with at least one satellite to obtain a current location, such as latitude and longitude of the electric bus. In some embodiments, the battery detection unit may have a detection circuit or other power detection software and hardware components for detecting the power of a specific battery module of the electric bus 110, thus to generate power detection data comprising a power state. For example, the battery detection unit can detect a current power state of the battery module of the electric bus.

In step S530, a route corresponding to the electric bus is obtained by the cloud management module, wherein the route includes at least one charging point, and records a location of the charging point and a charging efficiency of at least one charging equipment installed at the charging point.

The driving monitoring system of the electric bus can transmit the current location and power state of the electric bus via a network, and the cloud management module can receive the current location and power state of the electric bus via the network. After the current location and power state of the electric bus are obtained, in step S540, the cloud management module determines whether the electric bus needs to be charged with the charging equipment at the charging point according to the current location and the current power state of the electric bus.

In some embodiments, the cloud management module further calculates a remaining power state of the electric bus when it arrives the charging point according to the current location and the current power state of the electric bus, and determines whether the electric bus needs to be charged with the charging equipment at the charging point according to the remaining power state. In some embodiments, the route has a first charging point and a second charging point, and the distance between the electric bus and the first charging point is less than the distance between the electric bus and the second charging point, the processor instructs the electric bus to perform a charging operation at the first charging point when the processor determined that the electric bus cannot reach the second charging point based on the current location and the current power state of the electric bus.

In some embodiments, the processor obtains a first current location and a first current power state of a first electric bus, and a second current location and a second current power state of a second electric bus, and instructs one of the first electric bus and the second electric bus with a smaller amount of electricity to perform the charging operation at the first charging point when the processor determines that both the first electric bus and the second electric bus can reach the second charging point. In some embodiments, the processor further calculates a charging period, wherein the electric bus can at least travel to the second charging point after the electric bus is charged using the charging equipment with the charging efficiency for the charging period. In some embodiments, the processor further transmits the information of the first charging point or the charging period of the charging operation at the first charging point to the electric bus through the network connection unit of the cloud management. In some embodiments, the processor obtains a first current location and a first current power state of a first electric bus, and a second current location and a second current power state of a second electric bus, and instructs the first electric bus to perform the charging operation at the first charging point for a first charging period when the processor determined that neither the first electric bus nor the second electric bus can reach the second charging point, and the distance between the first electric bus and the first charging point is less than the distance between the second electric bus and the first charging point, wherein the first electric bus can at least travel to the second charging point after the first electric bus is charged by the charging equipment with the charging efficiency for the first charging period module. In some embodiments, the processor further calculates an estimated arrival time when the second electric bus arrives the first charging point, and instructs the first electric bus to end the charging operation before the estimated arrival time, wherein the first electric bus has already been charged for the first charging period before the estimated arrival time. In some embodiments, the processor further obtains a traffic state of the route, calculates the estimated arrival time when the second electric bus arrives the first charging point according to the traffic state, accordingly estimates the first charging period for the first electric bus, and calculates a remaining power state of the second electric bus when it arrives the first charging point, and a second charging period for the second electric bus.

For example, in an example, the route of an electric bus E1 includes a charging point A and a charging point B. The current location and power state of the battery module of the electric bus E1 can be transmitted to the cloud management module via a network, and the cloud management module can accordingly calculate a remaining power state of the electric bus E1 when it arrives at the charging point. When the remaining power state is less than 20% of the total battery power and it is determined that the electric bus E1 cannot reach the charging point B, the cloud management module determines that the electric bus E1 needs to be charged at the charging point A, and transmit the information of the charging point A and/or the charging period for charging at charging point A to the electric bus E1 via the network, such that the driver of the electric bus E1 can perform a charging operation at charging point A for the electric bus E1. In another example, the cloud management module can obtain the first current location and first power state of an electric bus E1, and the second current location and second power state of an electric bus E2. When the cloud management module determines that both the electric bus E1 and the electric bus E2 can reach the charging point B, and the electric bus E1 has less power, the cloud management module instructs the electric bus E1 to be charged at charging point A and instructs the electric bus E2 to be charged at the charging point B.

Therefore, the charging scheduling systems and methods for electric buses can automatically perform charging schedule management for all electric buses according to the current location and power state of the respective electric bus. The invention determines the urgency of charging, determine which bus to be charged at which charging point, and send relevant instructions to the respective electric bus, such that the respective electric bus does not have to spend a lot of time waiting in line at the charging point, and can be charged at a suitable station, thereby reducing the range anxiety for electric buses, and increasing passenger satisfaction and enhancing the practicability of charging service for electric buses, and further promoting the development of electric buses.

Charging scheduling methods for electric buses, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A charging scheduling system for electric buses, comprising:
   at least one electric bus having a driving monitoring system, comprising:
   a positioning unit for communicating with at least one satellite to obtain a current location of the electric bus;
   a battery detection unit for detecting a current power state of a battery module of the electric bus;
   a network connection unit; and
   a processing unit for transmitting the current location and the current power state of the electric bus via the network connection unit; and
   a cloud management module, comprising:
   a storage unit for recording a route corresponding to the electric bus, wherein the route has at least one charging point, and records a location of the charging point and a charging efficiency of at least one charging equipment installed at the charging point;
   a network connection unit for receiving the current location and the current power state of the electric bus via a network; and
   a processor for determining whether the electric bus needs to be charged with the charging equipment at the charging point according to the current location and the current power state of the electric bus,
   wherein the at least one electric bus includes a first electric bus and a second electric bus, and the processor further obtains a first current location and a first current power state of the first electric bus, obtains a second current location and a second current power state of the second electric bus, and determines whether the first electric bus and/or the second electric bus need(s) to be charged with the charging equipment at the charging point according to the first current location and the first current power state of the first electric bus and the second current location and the second current power state of the second electric bus.

2. The system of claim 1, wherein the processor further calculates a remaining power state of the electric bus when it arrives the charging point according to the current location and the current power state of the electric bus, and determines whether the electric bus needs to be charged with the charging equipment at the charging point according to the remaining power state.

3. The system of claim 1, wherein the route has a first charging point and a second charging point, and the distance between the electric bus and the first charging point is less than the distance between the electric bus and the second charging point, the processor instructs the electric bus to perform a charging operation at the first charging point when the processor determined that the electric bus cannot reach the second charging point based on the current location and the current power state of the electric bus.

4. The system of claim 3, wherein the processor instructs one of the first electric bus and the second electric bus with a smaller amount of electricity to perform the charging operation at the first charging point when the processor determines that both the first electric bus and the second electric bus can reach the second charging point.

5. The system of claim 3, wherein the processor further calculates a charging period, wherein the electric bus can at least travel to the second charging point after the electric bus is charged using the charging equipment with the charging efficiency for the charging period.

6. The system of claim 5, wherein the processor further transmits the information of the first charging point or the charging period of the charging operation at the first charging point to the electric bus through the network connection unit of the cloud management module.

7. The system of claim 3, wherein the processor instructs the first electric bus to perform the charging operation at the first charging point for a first charging period when the processor determined that neither the first electric bus nor the second electric bus can reach the second charging point, and the distance between the first electric bus and the first charging point is less than the distance between the second electric bus and the first charging point, wherein the first electric bus can at least travel to the second charging point after the first electric bus is charged by the charging equipment with the charging efficiency for the first charging period.

8. The system of claim 7, wherein the processor further calculates an estimated arrival time when the second electric bus arrives the first charging point, and instructs the first electric bus to end the charging operation before the estimated arrival time, wherein the first electric bus has already been charged for the first charging period before the estimated arrival time.

9. The system of claim 8, wherein the processor further obtains a traffic state of the route, calculates the estimated arrival time when the second electric bus arrives the first charging point according to the traffic state, accordingly estimates the first charging period for the first electric bus, and calculates a remaining power state of the second electric bus when it arrives the first charging point, and a second charging period for the second electric bus.

10. A charging scheduling method for electric buses for in at least one electric bus and a cloud management module, wherein the at least one electric bus includes a first electric bus and a second electric bus, the method comprising:
   obtaining a first current location of the first electric bus by a positioning unit of the first electric bus and obtaining a second current location of the second electric bus by a positioning unit of the second electric bus;
   detecting a first current power state of a battery module of the first electric bus by a battery detection unit of the first electric bus and detecting a second current power state of a battery module of the second electric bus by a battery detection unit of the second electric bus;
   obtaining a route corresponding to the first and second electric buses by the cloud management module, wherein the route includes at least one charging point, and records a location of the charging point and a charging efficiency of at least one charging equipment installed at the charging point; and
   determining, by the cloud management module, whether the first electric bus and/or the second electric bus need(s) to be charged with the charging equipment at the charging point according to the first current location and the first current power state of the first electric bus and the second current location and the second current power state of the second electric bus.

* * * * *